N. BRUNER.
Grist Alarm.
No. 168,965.  Patented Oct. 19, 1875.
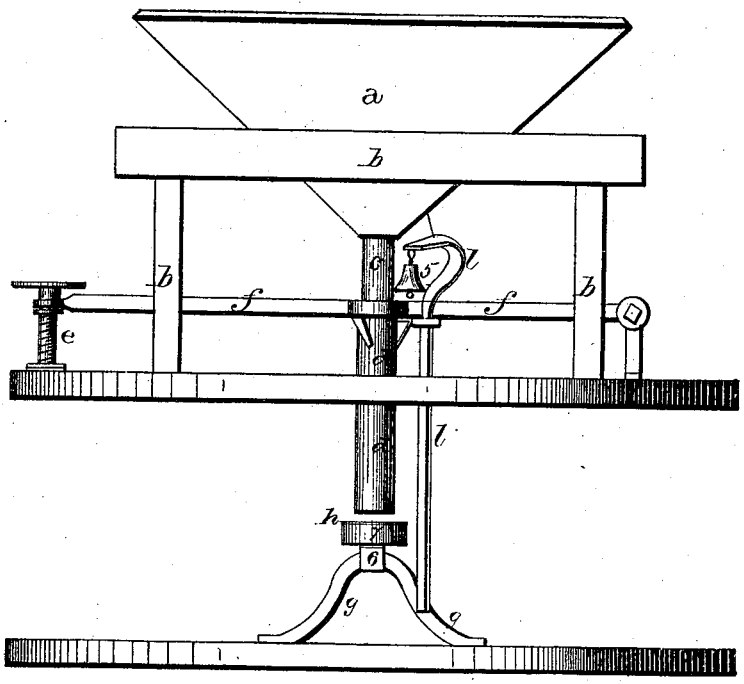
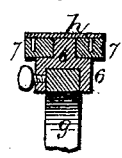
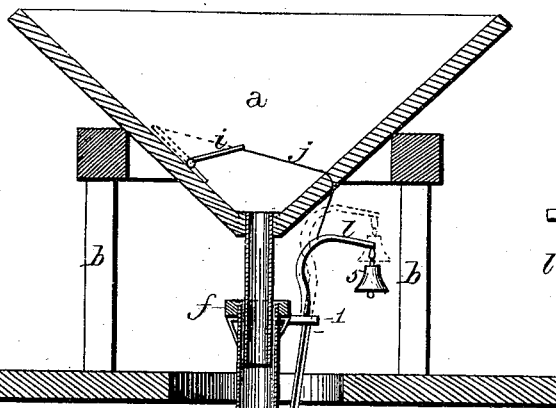
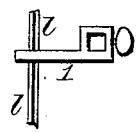
WITNESSES.
INVENTOR.
Noah Bruner
per
F. A. Lehmann, Atty

UNITED STATES PATENT OFFICE.

NOAH BRUNER, OF MECHANICSBURG, PENNSYLVANIA.

IMPROVEMENT IN GRIST-ALARMS.

Specification forming part of Letters Patent No. 168,965, dated October 19, 1875; application filed July 10, 1875.

*To all whom it may concern:*

Be it known that I, NOAH BRUNER, of Mechanicsburg, in the county of Cumberland and State of Pennsylvania, have invented certain new and useful Improvements in Alarm Attachments for Hoppers; and I do hereby declare the following to be a full, clear, and exact description of the invention, such as will enable others skilled in the art to which it pertains to make and use it, reference being had to the accompanying drawings, which form part of this specification.

My invention relates to an improved alarm attachment for hoppers; and it consists in the arrangement and combination of parts that will be more fully described hereinafter, whereby an alarm is given by the ringing of a bell as soon as the supply of grain in the hopper runs low.

Figure 1 is a side elevation of my invention. Fig. 2 is a section of the same.

$a$ represents a common hopper, which is supported in any suitable frame, $b$. The tube $c$, that conducts the grain from the hopper, has its lower end projecting down into the tube $d$, which is made adjustable up and down by means of the set-screw $e$ and lever $f$. Upon the top of the arch $g$ is secured a suitable plate or other device, $h$, which acts as a valve to the lower end of the adjustable tube $d$, and controls the flow of grain from the hopper. The valve or plate $h$ has a thick piece of leather, 7, secured to its under side, which leather has a hole cut in it to receive a projection on the top of the clevis 6. This clevis is secured to the top of the arch by means of a set-screw, and is adapted to be attached to any arch in use. The leather makes the plate fit tightly in place, and yet allows it to be removed at will. Secured to the inside of the hopper is a flat hinged plate or other equivalent device, $i$, to the upper hinged part of which is attached a string or small chain, $j$, which string or chain extends across the hopper, down through its side, and has attached to its lower end the curved rod $l$. This rod passes down through an arm that projects out from the side of the lever $f$, and is made movable up and down, the arm 1, that supports it, being made adjustable back and forth on the lever, so as to adapt the rod to the different-sized holes in the eye of the stones.

While there is a sufficient supply of grain in the hopper the weight of the grain keeps the hinged plate pressed back against the side of the hopper, as shown in dotted lines, and the lower end of the rod $l$ raised up above the top of the revolving arch $g$, that is attached to the millstone. As the supply of grain begins to run low its weight is no longer sufficient to hold the plate pressed back, so that the weight of the rod draws it forward until the rod sinks far enough down to be struck by the arch when the bell 5 on the upper end of the rod begins to ring, and thus sounds the alarm.

This apparatus will work with any kind of grain with unfailing accuracy, and always give the miller notice in time to prevent the heating and consequent injury to the stones.

Having thus described my invention, I claim—

1. The combination of the hopper $a$, hinged plate $i$, cord $j$, falling rod $l$, and bell 5 with the lever $f$, perforated arm 1, and set-screw $e$, whereby both the feed from the hopper and the distance the rod $l$ shall fall are regulated, substantially as shown.

2. The combination of the lever $f$, adjustable supporting-arm 1, and rod $l$, substantially as set forth.

In testimony that I claim the foregoing I have hereunto set my hand this 23d day of June, 1875.

NOAH BRUNER.

Witnesses:
F. A. LEHMANN,
WM. B. UPPERMAN.